(12) United States Patent
Lagies et al.

(10) Patent No.: US 10,884,494 B1
(45) Date of Patent: Jan. 5, 2021

(54) EYE TRACKING DEVICE CALIBRATION

(71) Applicant: MICROSOFT TECHNOLOGY LICENSING, LLC, Redmond, WA (US)

(72) Inventors: Arasch Uwe Lagies, Redmond, WA (US); Sergio Ortiz-Egea, Redmond, WA (US); Maria Esther Pace, Redmond, WA (US)

( * ) Notice: Subject to any disclaimer, the term of this patent is extended or adjusted under 35 U.S.C. 154(b) by 0 days.

(21) Appl. No.: 16/739,253

(22) Filed: Jan. 10, 2020

(51) Int. Cl.
*G06F 3/01* (2006.01)
*G02B 27/01* (2006.01)
*G06K 9/00* (2006.01)
*G02B 27/00* (2006.01)

(52) U.S. Cl.
CPC ......... *G06F 3/013* (2013.01); *G02B 27/0093* (2013.01); *G02B 27/017* (2013.01); *G06K 9/00597* (2013.01); *G02B 2027/0187* (2013.01)

(58) Field of Classification Search
CPC .. G06F 3/013; G06K 9/00604; G06K 9/6228; G06K 9/6271; G06K 9/00228; G06K 9/6256; G06T 7/74; G06T 7/80; G06T 2207/20081; G06T 2207/20084; G06T 2207/30201
See application file for complete search history.

(56) References Cited

U.S. PATENT DOCUMENTS

| 2007/0011609 | A1* | 1/2007 | Adjouadi | G06F 3/013 715/700 |
| 2014/0145935 | A1* | 5/2014 | Sztuk | G06K 9/00604 345/156 |
| 2017/0372487 | A1 | 12/2017 | Lagun et al. | |
| 2018/0239144 | A1 | 8/2018 | Woods et al. | |
| 2019/0228215 | A1 | 7/2019 | Najafirad et al. | |
| 2019/0251707 | A1 | 8/2019 | Gupta et al. | |

FOREIGN PATENT DOCUMENTS

WO 2019154511 A1 8/2019

OTHER PUBLICATIONS

Treisman, et al., "A Feature-Integration Theory of Attention", In Journal of Cognitive Psychology, vol. 12, Issue 1, Jan. 1, 1980, pp. 97-136.

(Continued)

*Primary Examiner* — Nelson M Rosario
(74) *Attorney, Agent, or Firm* — Shook, Hardy & Bacon, LLP

(57) ABSTRACT

The technology described herein generically calibrates the eye tracking apparatus in a head-mounted display (HMD) device making user-specific calibration unnecessary. The eye tracking apparatus uses one or more cameras to view the eyes of the user wearing the HMD device. From the images captured of the user's eyes, the generically calibrated HMD is able to determine a gaze direction for the user without the user needing to perform a user-specific calibration. The present technology bypasses the need for understanding user specific eye characteristics, such the shape of pupil and iris (ellipticity), by training a machine learning model on a large number of diverse eye images taken in diverse conditions. The machine learning model may take on the form of a convolutional neural network or some other regression based machine learning technology.

19 Claims, 8 Drawing Sheets

(56) References Cited

OTHER PUBLICATIONS

Zhu, et al., "Nonlinear Eye Gaze Mapping Function Estimation via Support Vector Regression", In Proceedings of 18th International Conference on Pattern Recognition, vol. 1, Aug. 20, 2006, 4 Pages.

Vig, et al., "Large-Scale Optimization of Hierarchical Features for Saliency Prediction in Natural Images", In Proceedings of the IEEE Conference on Computer Vision and Pattern Recognition, Jun. 23, 2014, pp. 2798-2805.

Wang, et al., "Deep Eye Fixation Map Learning for Calibration-Free Eye Gaze Tracking", In Proceedings of the Ninth Biennial ACM Symposium on Eye Tracking Research & Applications, Mar. 14, 2016, pp. 47-55.

Wen, et al., "Saliency Detection Based on Feature Learning using Deep Boltzmann Machines", In Proceedings of International Conference on Multimedia and Expo, Jul. 14, 2014, 6 Pages.

Williams, et al., "Sparse and Semi-Supervised Visual Mapping with the S^ GP", In Proceedings of IEEE Computer Society Conference on Computer Vision and Pattern Recognition, vol. 1, Jun. 17, 2006, 8 Pages.

Xu, et al., "Predicting Human Gaze Beyond Pixels", In Journal of Vision, vol. 14, Issue 1, Jan. 28, 2014, 20 Pages.

Yamins, et al., "Performance Optimized Hierarchical Models Predict Neural Responses in Higher Visual Cortex", In Proceedings of the National Academy of Sciences, vol. 111, Issue 23, Jun. 10, 2014, pp. 8619-8624.

Zhao, et al., "Learning a Saliency Map Using Fixated Locations in Natural Scenes", In Journal of Vision, vol. 11, Issue 3, Mar. 10, 2011, 15 Pages.

Zhu, et al., "Eye and Gaze Tracking for Interactive Graphic Display", In Journal of Machine Vision and Applications, vol. 15, Issue 3, Jul. 2004, pp. 139-148.

"Tom Clancy's Ghost Recon Breakpoint", Retrieved From: https://gaming.tobii.com/, Retrieved From: Feb. 4, 2020, 6 Pages.

Alnajar, et al., "Calibration-Free Gaze Estimation Using Human Gaze Patterns", In Proceedings of the IEEE International Conference on Computer Vision, Dec. 1, 2013, pp. 137-144.

Beymer, et al., "Eye Gaze Tracking Using an Active Stereo Head", In Proceedings of IEEE Computer Society Conference on Computer Vision and Pattern Recognition, vol. 2, Jun. 18, 2003, 8 Pages.

Cerf, et al., "Faces and Text attract Gaze Independent of the task: Experimental Data and Computer Model", In Journal of Vision, vol. 9, Issue 12, Nov. 18, 2009, 15 Pages.

Cerf, et al., "Predicting Human Gaze Using Low-Level Saliency Combined with face Detection", In Proceedings of Advances in Neural Information Processing Systems, 2007, 8 Pages.

Chen, et al., "A Probabilistic Approach to Online Eye Gaze Tracking without Personal Calibration", In Journal of IEEE Transactions on Image Processing, vol. 24, Issue 3, Mar. 2015, pp. 1076-1086.

Chen, et al., "A Robust 3D Eye Gaze Tracking System Using Noise Reduction", In Proceedings of the Symposium on Eye Tracking Research & Applications, Mar. 26, 2008, pp. 189-196.

Chen, et al., "Probabilistic Gaze Estimation Without Active Personal Calibration", In Proceedings of the IEEE Conference on Computer Vision and Pattern Recognition, Jun. 20, 2011, pp. 609-616.

Einhauser, et al., "Objects Predict Fixations better than early Saliency", In Journal of Journal of Vision, vol. 8, Issue 14, Nov. 20, 2008, 26 Pages.

Fukushima, Kunihiko, "Neocognitron: A self-Organizing Neural Network Model for a Mechanism of Pattern Recognition Unaffected by Shift in Position", In Journal of Biological Cybernetics, vol. 36, Issue 4, Apr. 1, 1980, pp. 193-202.

Funes, et al., "Geometric Generative Gaze Estimation (G3E) for Remote RGB-D Cameras", In IEEE Conference on Computer Vision and Pattern Recognition (CVPR), Jun. 2014, 17 Pages.

Guestrin, et al., "General Theory of Remote Gaze Estimation using the Pupil Center and Corneal Re?ections", In Journal of IEEE Transactions on Biomedical Engineering, vol. 53, Issue 6, Jun. 5, 2006, pp. 1124-1133.

Guestrin, et al., "Remote Point-of-Gaze Estimation Requiring a Single-Point Calibration for Applications with Infants", In Proceedings of the Symposium on Eye Tracking Research & applications, Mar. 26, 2008, pp. 267-274.

Hansen, et al., "In the Eye of the Beholder: A Survey of Models for Eyes and Gaze", In Journal of IEEE Transactions on Pattern Analysis and Machine Intelligence, vol. 32, Issue 3, Mar. 2010, pp. 478-500.

Harel, et al., "Graph-Based Visual Saliency", In Proceedings of the 19th International Conference on Neural Information Processing Systems, Dec. 4, 2006, 8 Pages.

Hou, et al., "Saliency Detection: A spectral Residual Approach", In Proceedings of IEEE Conference on Computer Vision and Pattern Recognition, Jun. 17, 2007, 8 Pages.

Itti, et al., "A Model of Saliency Based Visual Attention for Rapid Scene Analysis", In Journal of IEEE Transactions on Pattern Analysis and Machine Intelligence, vol. 20, Issue 11, Nov. 1998, pp. 1254-1259.

Itti, et al., "A Saliency-Based Search Mechanism for Overt and Covert Shifts of Visual Attention", In Journal of Vision Research, vol. 40, Issue 10-12, Jun. 1, 2000, pp. 1489-1506.

Judd, et al., "A Benchmark of Computational Models of Saliency to Predict Human Fixations", In MIT Technical Report, Jan. 13, 2012, 24 Pages.

Judd, et al., "Learning to Predict where Humans Look", In Proceedings of 12th International Conference on Computer Vision, Sep. 29, 2009, pp. 2106-2113.

Kienzle, et al., "Center-Surround Patterns Emerge as Optimal Predictors for Human Saccade Targets", In Journal of Vision, vol. 9, Issue 5, May 13, 2009, 15 Pages.

Krizhevsky, et al., "Image net Classifcation with Deep Convolutional Neural Networks", In Proceedings of Advances in Neural Information Processing Systems, Jan. 2012, 9 pages.

Kullback, et al., "On Information and Sufficiency", In Journal of The Annals of Mathematical Statistics, vol. 22, Issue 1, Mar. 1, 1951, pp. 79-86.

Kummerer, et al., "Deep Gaze i: Boosting Saliency Prediction with Feature Maps Trained on Imagenet", In Repository of arXiv:1411.1045v1, Nov. 4, 2014, 14 Pages.

Le, Quoc V., "Building High-Level Features using Large Scale Unsupervised Learning", In Proceedings of International Conference on Acoustics, Speech and Signal Processing, May 26, 2013, pp. 8595-8598.

Lecun, Yann, "Learning Invariant Feature Hierarchies", In Proceedings of European Conference on Computer Vision, Oct. 7, 2012, pp. 496-505.

Lee, et al. "Convolutional Deep Belief Networks for Scalable Unsupervised Learning of Hierarchical Representations", In Proceedings of the 26 the International Conference on Machine Learning, Jun. 14, 2009, pp. 609-616.

Lin, et al., "Saliency Detection Within a Deep Convolutional Architecture", In Workshops at the Twenty-Eighth AAAI Conference on Artificial Intelligence, Jun. 18, 2014, pp. 31-37.

Lu, et al., "Head Pose-Free Appearance-Based Gaze Sensing via Eye Image Synthesis", In Proceedings of the 21st International Conference on Pattern Recognition, Nov. 11, 2012, pp. 1008-1011.

Lu, et al., "Inferring Human Gaze from Appearance via Adaptive Linear Regression", In Proceedings of International Conference on Computer Vision, Nov. 6, 2011, pp. 153-160.

Maio, et al., "Constraint-Based Gaze Estimation Without Active Calibration", In Proceedings of Ninth IEEE International Conference on Automatic Face and Gesture Recognition, Mar. 21, 2011, pp. 627-631.

Mancas, et al., "From Saliency to Eye Gaze: Embodied Visual Selection for a Pan-Tilt based Robotic Head", In Proceedings of the Seventh International Symposium on Visual Computing, Sep. 26, 2011, 12 Pages.

Mason, et al., "Look into my Eyes: Gaze Direction and Person Memory", In Journal of Memory, vol. 12, Issue 5, Sep. 1, 2004.

Model, et al., "An Automatic Personal Calibration Procedure for Advanced Gaze Estimation Systems", In Journal of IEEE Transactions on Biomedical Engineering, vol. 57, Issue 5, May 2010, pp. 1031-1039.

(56) References Cited

OTHER PUBLICATIONS

Morimoto, et al., "Eye Gaze Tracking Techniques for Interactive Applications", In Journal of Computer Vision and Image Understanding, vol. 98, Issue 1, Apr. 1, 2005, pp. 4-23.

Nuthmann, "Object-Based Attentional Selection in Scene Viewing", In Journal of Vision, vol. 10, Issue 8, Jul. 26, 2010, 19 Pages.

Olshausen, et al., "Emergence of Simple-Cell Receptive Field Properties by Learning a Sparse Code for Natural Images", In Journal of Nature, vol. 381, Issue 6583, Jun. 13, 1996, pp. 607-609.

Olshausen, et al., "Sparse Coding with an Overcomplete Basis Set: A Strategy Employed by V1?", In Journal of Vision Research, vol. 37, Issue 23, Dec. 1997, pp. 3311-3325.

Riche, et al., "Saliency and Human Fxations: State-of-the Art and Study of Comparison Metrics", In Proceedings of the IEEE International Conference on Computer Vision, Dec. 1, 2013, pp. 1153-1160.

Riesenhuber, et al., "Hierarchical Models of Object Recognition in Cortex", In Journal of Nature Neuroscience, vol. 2, Issue 11, Nov. 1999, pp. 1019-1025.

Rosenholtz, Ruth, "A Simple Saliency Model Predicts a Number of Motion Popout Phenomena", In Journal of Vision Research, vol. 39, Issue 19, Oct. 1, 1999, pp. 3157-3163.

Serre, et al., "Robust Object Recognition with Cortex-like Mechanisms", In Journal of IEEE Transactions on Pattern Analysis and Machine Intelligence, vol. 29, Issue 3, Jan. 22, 2007, pp. 411-426.

Shen, et al., "Learning to Predict Eye Fixations for Semantic Contents Using Multi-Layer Sparse Network", In Journal of Neurocomputing, vol. 138, Aug. 22, 2014, pp. 61-68.

Shih, et al., "A Novel Approach to 3-D Gaze Tracking Using Stereo Cameras", In Journal of IEEE Transactions on Systems, Man, and Cybernetics, Part B (Cybernetics), vol. 32, Issue 1, Feb. 2004, pp. 234-245.

Sugano, et al., "An Incremental Learning Method for Unconstrained Gaze Estimation", In Proceedings of 10th European Conference on Computer Vision, Oct. 12, 2008, 12 Pages.

Sugano, et al., "Appearance-Based Gaze Estimation Using Visual Saliency", In Journal of IEEE Transaction on Pattern Analysis and Machine Intelligence, vol. 35, Issue 2, Feb. 2013, pp. 329-341.

Sugano, et al., "Calibration Free Gaze Sensing Using Saliency Maps", In Proceedings of Computer Society Conference on Computer Vision and Pattern Recognition, Jun. 13, 2010, pp. 2667-2674.

Sugano, et al., "Learning-by-Synthesis for Appearance-Based 3D Gaze Estimation", In Proceedings of the IEEE Conference on Computer Vision and Pattern Recognition, Jun. 23, 2014, pp. 1821-1828.

Tan, et al., "Appearance Based Eye Gaze Estimation", In Proceedings of 6th IEEE Workshop on Applications of Computer Vision, Dec. 4, 2002, 5 Pages.

Valenti, et al., "What are You looking at?", In International Journal of Computer Vision, vol. 98, Issue 3, Jul. 1, 2012, pp. 324-334.

\* cited by examiner

EYE TRACKING DEVICE CALIBRATION

BACKGROUND

Eye (gaze) tracking devices, such as the cameras in an augmented reality headset, capture images or a video stream from the user's eyes as a means to determine in which direction the user is looking. The positioning of the eyes needs to be determined to get the actual direction the user is looking. Different analytical gaze-detection methods can be used to determine (calculate) the left and right eye positioning. These methods can attempt to determine various eye characteristics (e.g., projection of light reflected on the eye (glints), the shape of pupil and iris (ellipticity)) in order to determine in which direction the user is looking. All these gaze direction calculations require extrinsic and intrinsic parameters in order to determine the relationship between the coordinate-space of the eye-observing camera(s) and the world-coordinate space of the object the eyes are looking at. Intrinsic and extrinsic parameters need to be determined by performing per-person calibrations for each user of a device, such as augmented reality headsets. These calibrations can be time-consuming, tiring, and susceptible to user induced error.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein generically calibrates the eye tracking apparatus in a head-mounted display (HMD) device making user-specific calibration unnecessary. The eye tracking apparatus uses one or more cameras to view the eye or eyes of the user wearing the HMD device. From the images captured of the user's eyes, the generically calibrated HMD is able to determine a gaze direction for the user without the user needing to perform a user-specific calibration. The technology described herein determines the gaze direction without first explicitly identifying eye features of the user, such as the shape of pupil and iris (ellipticity). Current technology's reliance on determining the physical features of an eye requires user-specific calibration to understand how an individual user's eye characteristics change when gazing in different directions.

The present technology bypasses the need for understanding user specific eye characteristics, or even generic eye characteristics, by training a machine learning model on a large number of diverse eye images taken in diverse conditions. The machine learning model may take on the form of a convolutional neural network or some other regression based machine learning technology. Once trained, the machine learning model is able to take unlabeled images of the user's eyes and determine a gaze direction.

BRIEF DESCRIPTION OF THE DRAWINGS

Aspects of the invention are described in detail below with reference to the attached drawing figures, wherein.

DETAILED DESCRIPTION

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein generically calibrates the eye tracking apparatus in a head-mounted display (HMD) device making user-specific calibration unnecessary. The eye tracking apparatus uses one or more cameras to view the eye or eyes of the user wearing the HMD device. From the images captured of the user's eyes, the generically calibrated HMD is able to determine a gaze direction for the user without the user needing to perform a user-specific calibration. The technology described herein determines the gaze direction without first explicitly identifying eye features of the user, such as the shape of pupil and iris (ellipticity). Current technology's reliance on determining the physical features of an eye requires user-specific calibration to understand how an individual user's eye characteristics change when gazing in different directions.

The present technology bypasses the need for understanding user specific eye characteristics, or even generic eye characteristics, by training a machine learning model on a large number of diverse eye images taken in diverse conditions. The diverse eye characteristics can include eyes of different size, shape, color, separation between two eyes, and ethnicity. In one aspect the eye images include the area surrounding the eye. As such the image may include the side of the nose, eyebrows, eyelashes, eyelids, and other portions of the face surrounding the eyes. It is noted that characteristics surrounding the eye may change as the user's gaze changes, and it is desirable to capture these characteristics in both the training images and live images. In addition to the diverse eye characteristics, the training data may capture eye images under different lighting conditions (e.g., outdoor sunny, outdoor cloudy, outdoor at night, indoor bright lights, indoor dim lights) and with people wearing glasses and not wearing glasses. The collection of training data is described with reference to FIG. 1.

Figure 1:
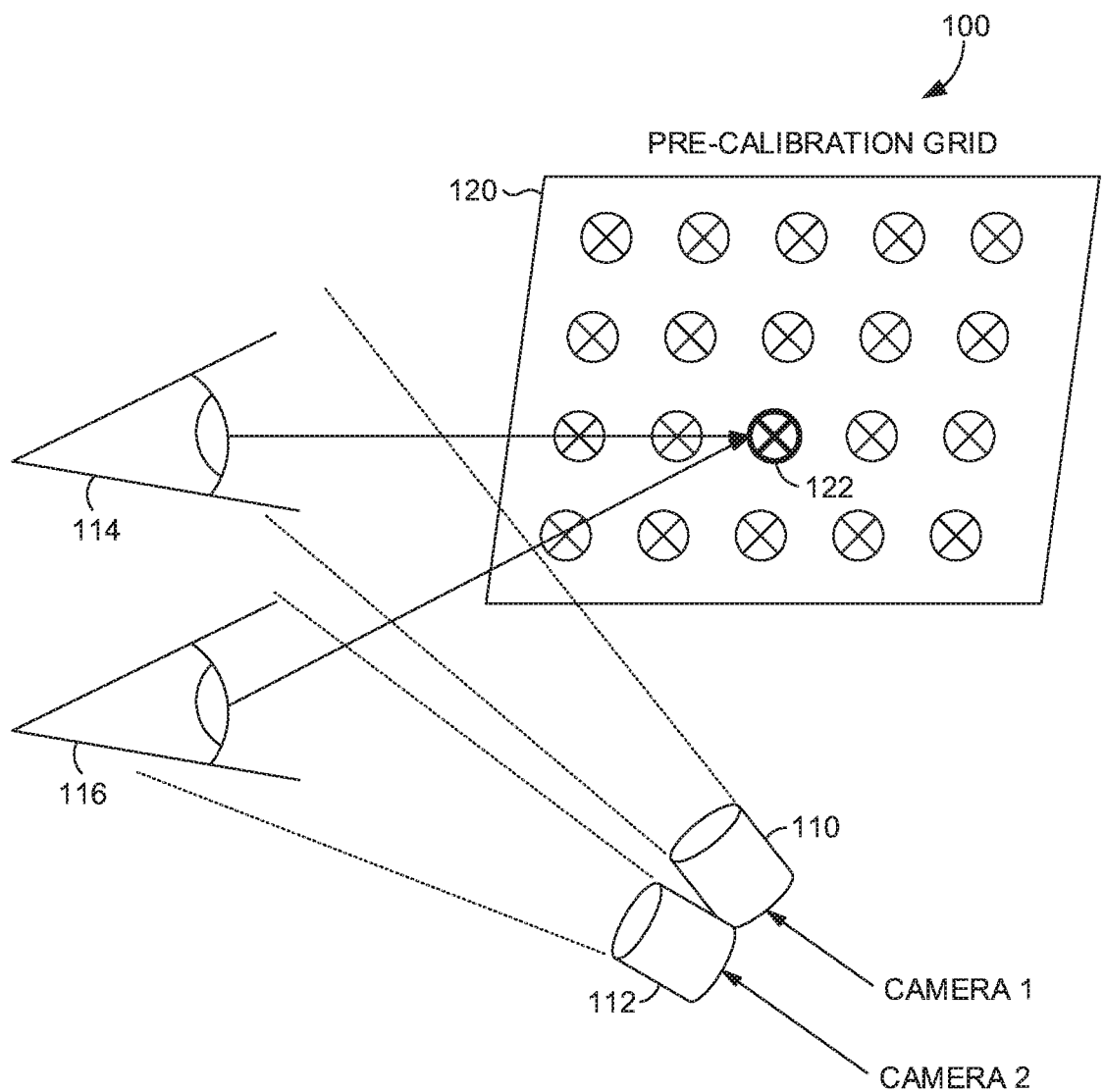
FIG. 1 is a diagram showing a calibration arrangement for gathering training images for calibrating an eye tracking model, in accordance with an aspect of the technology.

FIG. 1 describes an environment 100 for generating generic-training data for calibration of head-mounted computing devices. The generic-training data is generated using trainers. Trainers are people who are not the end user of the HMD device. A large group of trainers go through a detailed calibration routine to generate the training data. An individual trainer may repeat the calibration routine under different conditions that can be real or simulated. For example, a training facility may have rooms that simulate outdoor sunny lighting, outdoor cloudy lighting, or outdoor nighttime lighting. Of course different rooms need not be used, a single room in the training facility could simulate different lighting conditions both indoor and outdoor. Regardless, the end result is that an individual trainer may perform a series of calibration tests under different conditions in order to generate a plurality of training data. Individuals in the large group of trainers may be selected for diverse eye characteristics, such as eye size, shape, color, ethnicity, and separation.

In one aspect, the trainer wears an HMD device that includes a first camera 110 and a second camera 112. The first camera 110 may be focused on the right eye 114 of the trainer while the second camera 112 is focused on the left eye 116 of the trainer. The HMD device can output for display a generic-calibration grid 120. This may also be described as a pre-calibration grid since it is used to pre-calibrate the HMD without the input of the person ultimately using the HMD. The generic-calibration grid 120 includes 20 designated locations. Aspects of the technology described herein are not limited to use with 20 designated locations, and in some instances the generic-calibration grid 120 can include more than 20 or less than 20 designated locations. In general, the number of designated locations should increase as the size of the user interface increases.

The training data requires a ground truth indicating where the trainer is looking at the time an image(s) is taken. In one aspect, a designated location, such as designated location 122, turns a different color and then the trainer makes a positive affirmation indicating they are looking at the designated location causing an image to be captured. The positive affirmation could take the form of pressing a button on the HMD or other input device communicatively coupled to the HMD or some other computing device coordinating the collection of calibration data. The result is a labeled image of the trainer's eye. The label consists of the designated location that the trainer was gazing at when the image was taken. This process may be repeated multiple times for each designated location on a calibration grid ultimately forming training data for the machine learned model. This process can be repeated hundreds of thousands or tens of thousands of different times with different trainers under different conditions to generate a suitable corpus of training data.

Figure 2:
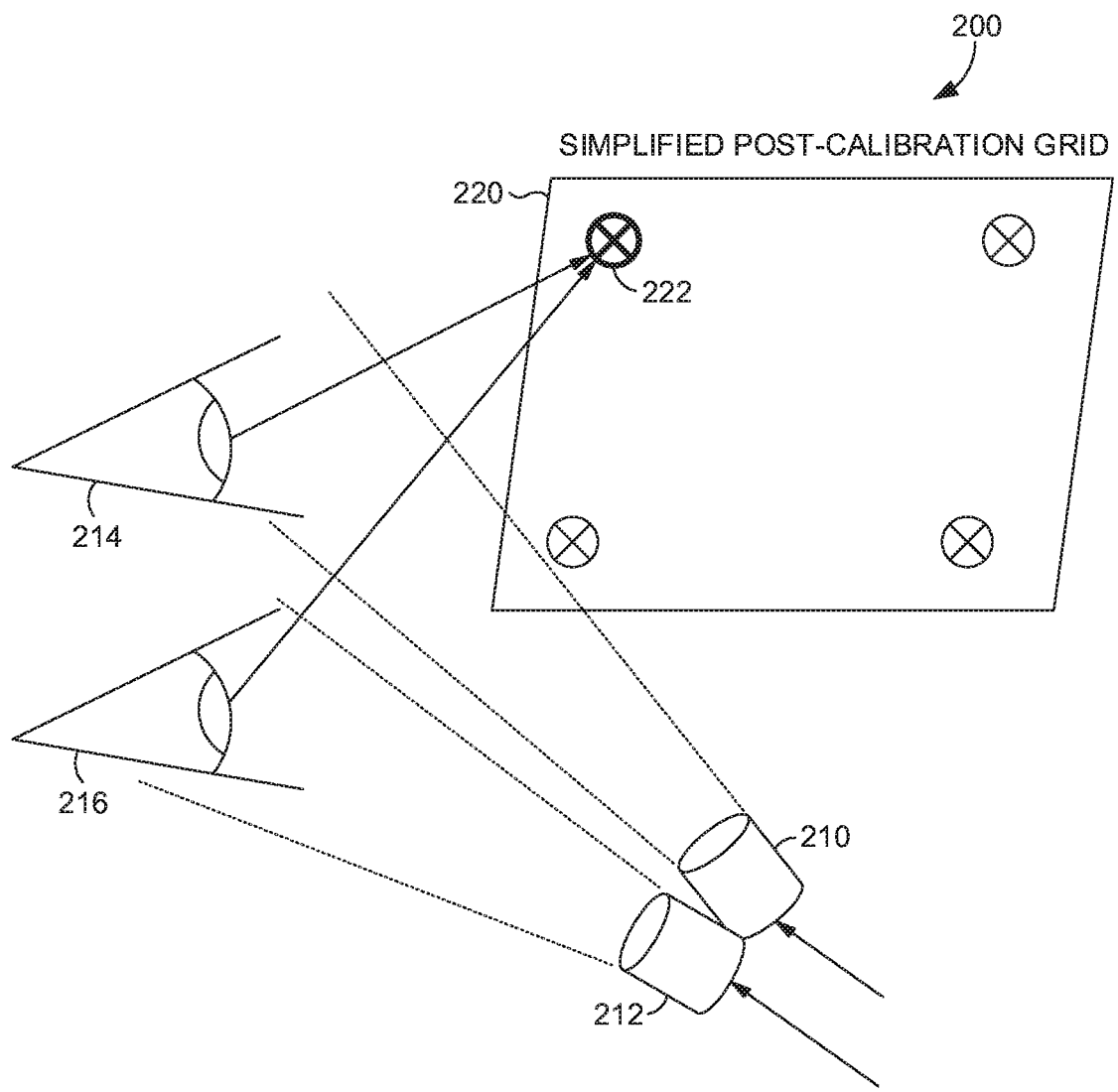
FIG. 2 is a diagram showing a tuning arrangement for gathering training images for calculating correction factors for an eye tracking model, in accordance with an aspect of the technology.

FIG. 2 describes an environment 200 for generating user-specific training data for tuning of pre-calibrated head-mounted computing devices. As mentioned previously, an HMD device with a pre-trained machine learning model will not need user-specific calibration in order to detect a user's gaze direction. However, in some instances it may be desirable to tune the pre-trained machine learning model using user specific calibration data. The tuning can occur by generating correction factors to the model using training data from a calibration process that is much less arduous to the user than the calibration test used by trainers.

As with FIG. 1, the HMD includes a first camera 210 and a second camera 212. The first camera 210 is directed at the user's right eye 214 and a second camera 212 is directed to the user's left eye 216. A simplified, user-specific calibration grid 220 is output for display by the HMD. As can be seen, the simplified user-specific calibration grid 220 only includes four designated locations, in contrast to the 20 shown on the generic-calibration grid 120. The calibration test may comprise the user being asked to look at each of the designated locations in turn. In one instance, a designated location may change colors, such as illustrated by designated location 222, and the user is asked to give an affirmation when gazing at the designated location. An image of the user's eyes is then captured and labeled with the designated location at which the user was gazing when the image was taken. The use of the user specific training data will be described in more detail with reference to FIG. 3.

Figure 3:
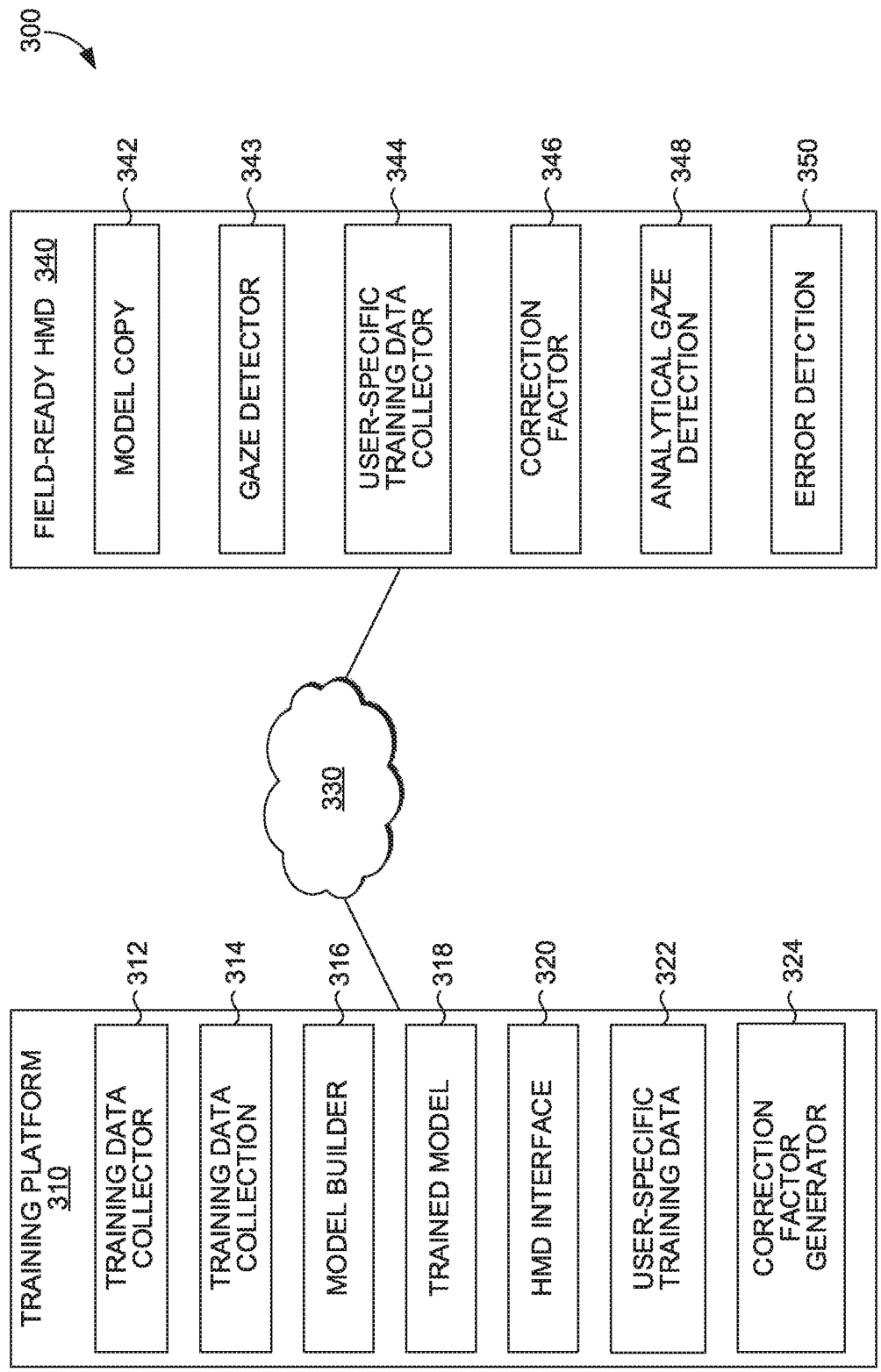
FIG. 3 is a diagram showing a model training environment, according to an aspect of the technology described herein.

Referring now to FIG. 3, a block diagram is provided showing aspects of an example computing system architecture suitable for implementing an aspect of the technology and designated generally as system 300. System 300 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location.

Example system 300 includes training platform 310, which hosts various components of system 300 including training data collector 312, training data collection 314, model builder 316, trained model 318, HMD interface 320, user-specific training data 322, and correction factor generator 324. System 300 also includes field-ready head-mounted computing device 340, which may be coupled to the training platform 310 via a network 330, such as the Internet. The field-ready HMD 340 comprises trained model copy 342, model gaze detector 343, user-specific training data collector 344, correction factor 346, analytical gaze detection component 348, and error detection 350. These components of system 300 may be embodied as a set of compiled computer instructions or functions, program modules, computer software services, or an arrangement of processes carried out on one or more computer systems, such as computing device 800 described in connection to FIG. 8, for example.

In one aspect, the functions performed by components of system 300 are associated with one or more personal assistant applications, services, or routines. In particular, such applications, services, or routines may operate on one or more user devices, servers, may be distributed across one or more user devices and servers, or be implemented in the cloud. Moreover, in some aspects, these components of system 300 may be distributed across a network, including one or more servers and client devices, in the cloud, or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 300, it is contemplated that in some aspects, functionality of these components can be shared or distributed across other components.

The training platform 310 generates a trained model that can be stored on a large number of HMD devices, such as augmented reality headsets, for use by a variety of different users. The trained model can determine the gaze of a user wearing the HMD without prior calibration. As mentioned, additional tuning may be desirable in certain circumstances, such as where the user's eye characteristics or operating conditions do not closely match those in the training data.

Training data collector 312 receives and stores training data generated by the trainers as described previously with reference to FIG. 1. The training data received by the training data collector 312 becomes the training data collection 314.

Model builder 316 uses the training data to build the trained model 318. In one aspect, the gaze detection model is a neural network. As used herein, a neural network comprises at least three operational layers. The three layers can include an input layer, a hidden layer, and an output layer. Each layer comprises neurons. The input layer neurons pass data to neurons in the hidden layer. Neurons in the hidden layer pass data to neurons in the output layer. The output layer then produces a classification. Different types of layers and networks connect neurons in different ways.

Neurons have weights and biases, an activation function that defines the output of the neuron given an input (including the weights and biases), and an output. The weights and biases are the adjustable parameters that cause a network to produce a correct output. The weights and biases are adjusted during training Once trained, the weights and bias associated with a given neuron can remain fixed. The other data passing between neurons can change in response to a given input (e.g., image). Retraining the network with an additional training image can update one or more weights and biases in one or more neurons.

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network). The training implementation is described subsequently in association with a convolutional neural network, but aspects of the technology are applicable to other types of multi-layer machine classification, object detection, and segmentation technology.

In one aspect, the trained model 318 comprises an input layer, five convolutional layers and three fully connected layers. Aspects of the technology described herein are not limited to this arrangement. The input layer converts the eye image into data that can be processed by the first convolutional layer. In one aspect, the input layer comprises three layered arrays. Each node in the array represents a pixel in the training image. Each array represents either red, green, or blue. In the red array, a node can be the intensity of red associated with the node's pixel. In this way, each pixel is represented by three nodes, one in each sub-layer within the input layer.

Initially, an image from the training data collection 314 is processed as input. The processing occurs the same way whether in training or production mode. The only difference is that the neuron weights and biases in the model may be changed after a classification is produced while in training mode. In this example, the image can be 224×224 pixels. The depth of input layer can be described as three because each pixel can have a red, green, and blue (RGB) pixel intensity value.

The first convolution layer can comprise multiple sublayers, described herein as feature maps. Each feature map (i.e., sublayer) can be associated with a different filter operation. The filter operation can be described as a neuron's activation function. The goal of the filter can be to detect low-level shapes in an image, such as a curve or line. Each filter operation works on a group of pixels in the image that can be described as a receptive field. Each neuron in a sublayer has a different receptive field. The output of the filter operation combined with a weights and bias assigned to a neuron can be the neuron's output. For example, a filter operation on a 5×5×3 receptive field of the input layer can produce a single value. When combined with the weights and bias of the neuron, the result is the output of a single neuron in the first convolutional layer. This process is repeated for adjacent neurons in the feature map, which will each use a different receptive field. The process can also be repeated on the same receptive field by each neuron in different feature maps within the convolutional layer using the filter operation associated with the respective feature map.

If the receptive field contains a sought after feature (e.g., a curve, honeycomb shape, a triangle), then a different number would result than if it did not. For example, a filter operation that did not find a sought after feature could return a zero value in contrast to a value of 1000 if the feature in the image exactly matched a feature in the filter. The filters may be selected to detect features of any eye know to be associated with gaze detection. In one aspect, part of the training can be to learn what filters are predictive of a user's gaze.

The feature map is populated by running the same filter operation over different receptive fields of the input layer, eventually processing the entire input layer. Sections of the input layer to be mapped are determined by the stride selected. The stride is a distance between center pixels of adjacent receptive fields. The adjacent receptive fields are associated with adjacent neurons. A stride of one pixel would cause the adjacent receptive field to have a center pixel adjacent to a center pixel in the first receptive field. A stride of two would cause the center pixel of a receptive field to move over two pixels. Aspects of the technology can be used with different strides, such as a stride of 2, 4, or 6.

The first convolutional layer comprises multiple feature maps; each feature map comprising an array or layer of neurons populated using the same filter operation. The first feature map can look for curves, the second feature map lines, the third feature map a blue color blob, and so on. Different weights and biases can be calculated for each neuron during training. A convolutional layer with 48 feature maps can be said to have a depth of 48. The height and width dimensions will depend on the image size, receptive field size, and stride. For this example, the first convolutional layer can have a height and width of 55.

Accordingly, the first convolutional layer can comprise a plurality of feature maps. Each feature map can be a single dimensional array of numbers produced by a single filter operation on a group of pixels. The more filters used, the more feature maps the convolutional layer will contain. For example, using 48 filters will produce a first convolutional layer 306 having a depth of 48 different arrays.

The other convolutional layers can work in a similar fashion, with a receptive field of various dimensions in a prior layer mapping to a neuron in a subsequent layer. The functions can be of different types in different layers, for example, pooling functions, rectified linear unit operations, and such.

For example, the second convolutional layer can be a pooling layer that comprises neurons arranged in feature maps that perform a down sampling operation. A purpose of the pooling layer is to reduce the amount of data to process. Each neuron in the second convolutional layer has a receptive field in the first convolutional layer. For example, a neuron could have a receptive field of 2×2 neurons meaning it processes the output of those four neurons. In a pooling operation, the highest value of the four values produced by neurons in the 2×2 grid within the receptive field can be selected by the activation function of a single neuron in the second convolutional layer. The output of this neuron can be the highest value adjusted according to the weights, if any, assigned to the neuron.

The CNN can include fully-connected layers and an output layer. The output layer produces a gaze location. In one aspect, the gaze location is the highest score of a gaze direction distribution. In other examples, the output can be a confidence score associated with one or more gaze directions. The confidence scores may be used to perform an extrapolation between points modeled by the CNN to arrive at the ultimate gaze direction.

In each type of deep model, training is used to fit the model output to the training data. In particular, weights and biases associated with each neuron in the model can be updated through training. Originally, the model can comprise random weights and bias values that are adjusted during training. In one aspect, the model is trained using backpropagation. The backpropagation process comprises a forward pass, a loss function, a backward pass, and a weights and bias update. This process is repeated for each training image. The goal is to update the weights and biases of each neuron (or other model component) to cause the model to produce an output that maps to the correct label. As mentioned, the training data collection 314 comprises labeled images. Each labeled image is input to the model and used to train it. Once a sufficient number of training images are fed to the model builder 316, then the training can stop. The trained model 318 can then be used to detect a user gaze direction from unlabeled images.

HMD interface 320 communicates with different HMDs. The HMD interface 320 may communicate the trained model 318 to an HMD 340. The HMD interface may receive user-specific training data from the user-specific training data collector 344. The HMD interface 320 may also communicate correction factors to the field-ready HMD 340.

User-specific training data 322 may be collected at a specific field-ready HMD and communicated to the training platform 310. In another embodiment, the HMD 340 includes a correction factor generator and generates correction factors without using the training platform 310. With permission of the user, the user-specific data could optionally be added to the training data collection 314 for use training an updated model at some point.

Correction factor generator 324 generates a correction factor that is used to tune the trained model 318 to the eyes of a specific user. The correction factors can be additive or multiplicative parameters to compensate for offsets. In another implementation the correction factors are used as parameters of a function. The function is used to correct offsets in gaze direction at some extreme angles. The user-specific training data is used to determine the parameters of the correction function. The correction function can be a quadratic or higher order function.

The field-ready HMD 340 may be an augmented reality headset or another head-mounted device that includes gaze detection technology.

Trained model copy 342 is used by the gaze detector 343 to determine the gaze of a user wearing the HMD 340. The trained model copy 342 receives images of the user's eyes and outputs a gaze direction.

Model gaze detector 343 collects images of the user's eyes and feeds one or more images to the trained model copy 342 to determine the gaze of the user. The model gaze detector 343 may receive images and output the eye gaze direction for consumption by other components of the HMD 340.

User-specific training data collector 344 collects user-specific calibration data as described previously with reference to FIG. 2. In brief, the user is asked to look at a portion of an image and images of the user's eyes are captured while looking at the portion. The user-specific training data comprises images of the user's eyes and corresponding labels indicating where the user was looking when the image was taken.

Correction factor component 346 stores is the result of the calculations done by correction factor generator 324. The correction factor component uses the correction factors to tune the model copy 342 to more accurately determine the gaze detection of a specific user.

Analytical gaze detection component 348 generates a separate and distinct gaze detection direction from the gaze direction determined by the gaze detector 343. The analytical gaze detection component 348 uses a separate and distinct technology for determining the gaze of the user using the same eye images as those used by the gaze detector 343. The gaze detection component 348 may use any technology currently known to detect a user's gaze, including those that require more extensive user calibration. In one aspect the analytical gaze detection component 348 uses an eye-characteristic based method that attempts to ascertain the geometry of various eye components in order to detect the user's gaze direction.

Error detection 350 compares the gaze direction generated by the gaze detector 343 with the gaze direction determined by the analytical gaze detection component 348. A delta may be calculated between the two directions and compared to a threshold. If the delta is less than the threshold, then the gaze direction determined by the gaze detector 343 using the model copy 342 is output for consumption by other components of the HMD 340. For example, the gaze direction can be used to manipulate a visible cursor or other component on a user interface. On the other hand if the Delta exceeds a threshold, then a single instance of the gaze direction may be discarded without use by the HMD 340. This can result in a single gap with a string of gaze detection indications output by the gaze detector 343. The user's gaze may be determined multiple times per second, so the omission of a single reading or even series of readings may not affect operation of the HMD 340. These errors can be detected and logged. Upon logging in a certain number of errors, an error report may be generated and sent to the user, the training platform 310, or some other quality control function. In one aspect, an initial user-specific training is suggested to the user upon detecting a threshold number of errors.

Figure 4:
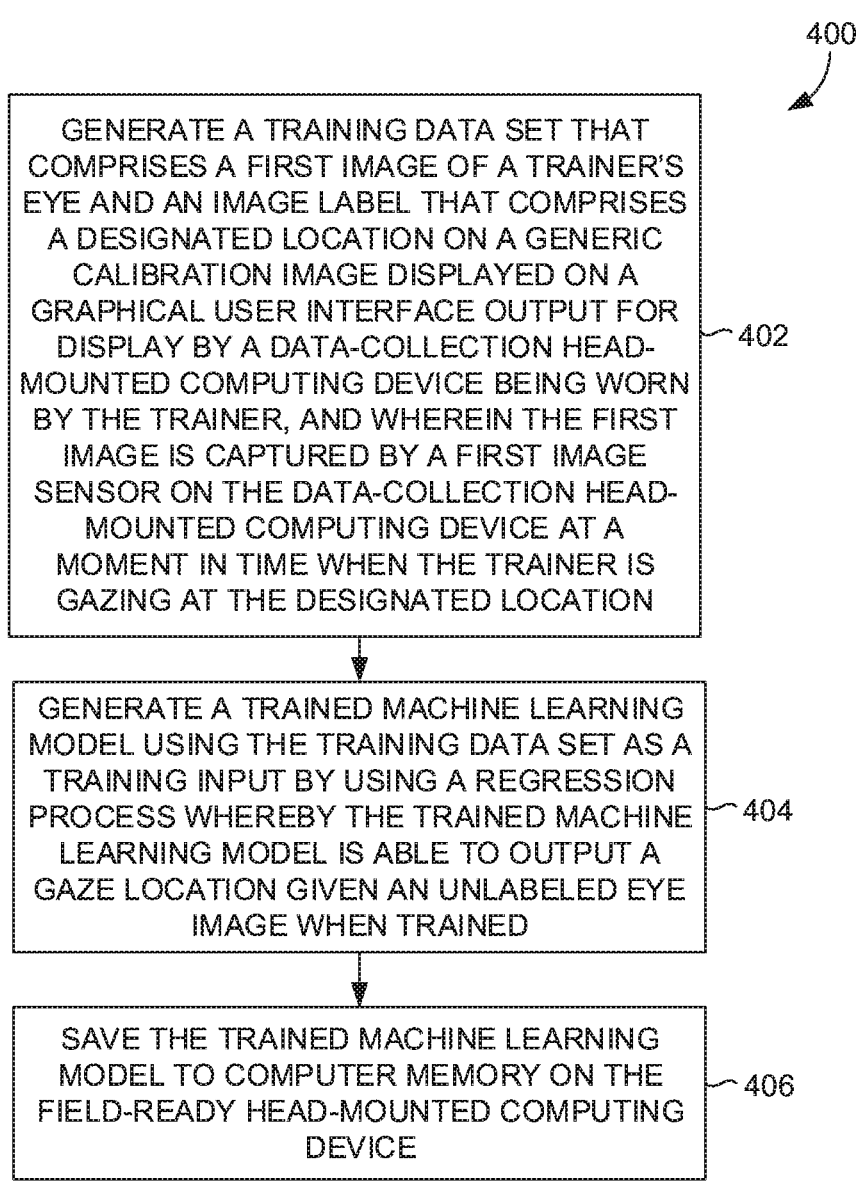
FIGS. 4-6 depict flow diagrams of methods for pre-calibrating an eye tracking apparatus of a head-mounted computing device, in accordance with an aspect of the technology.

Turning now to FIG. 4, a flow chart showing a method 400 for pre-calibrating an eye tracking apparatus of a field-ready head-mounted computing device is provided.

At step 402, a training data set that comprises a first image of a trainer's eye and an image label is generated. The image label comprises a designated location on a generic calibration image displayed on a graphical user interface output for display by a data-collection head-mounted computing device being worn by the trainer. The first image is captured by a first image sensor on the data-collection head-mounted computing device at a moment in time when the trainer is gazing at the designated location. The collection of training sets has been described previously with reference to FIG. 1.

At step 404, a trained machine learning model is generated using the training data set as a training input by using a regression process whereby the trained machine learning model is able to output a gaze location given an unlabeled eye image when trained. Training a machine learning model has been described previously with reference to FIG. 3.

At step 406, the trained machine learning model is saved to computer memory on the field-ready head-mounted computing device.

Figure 5:
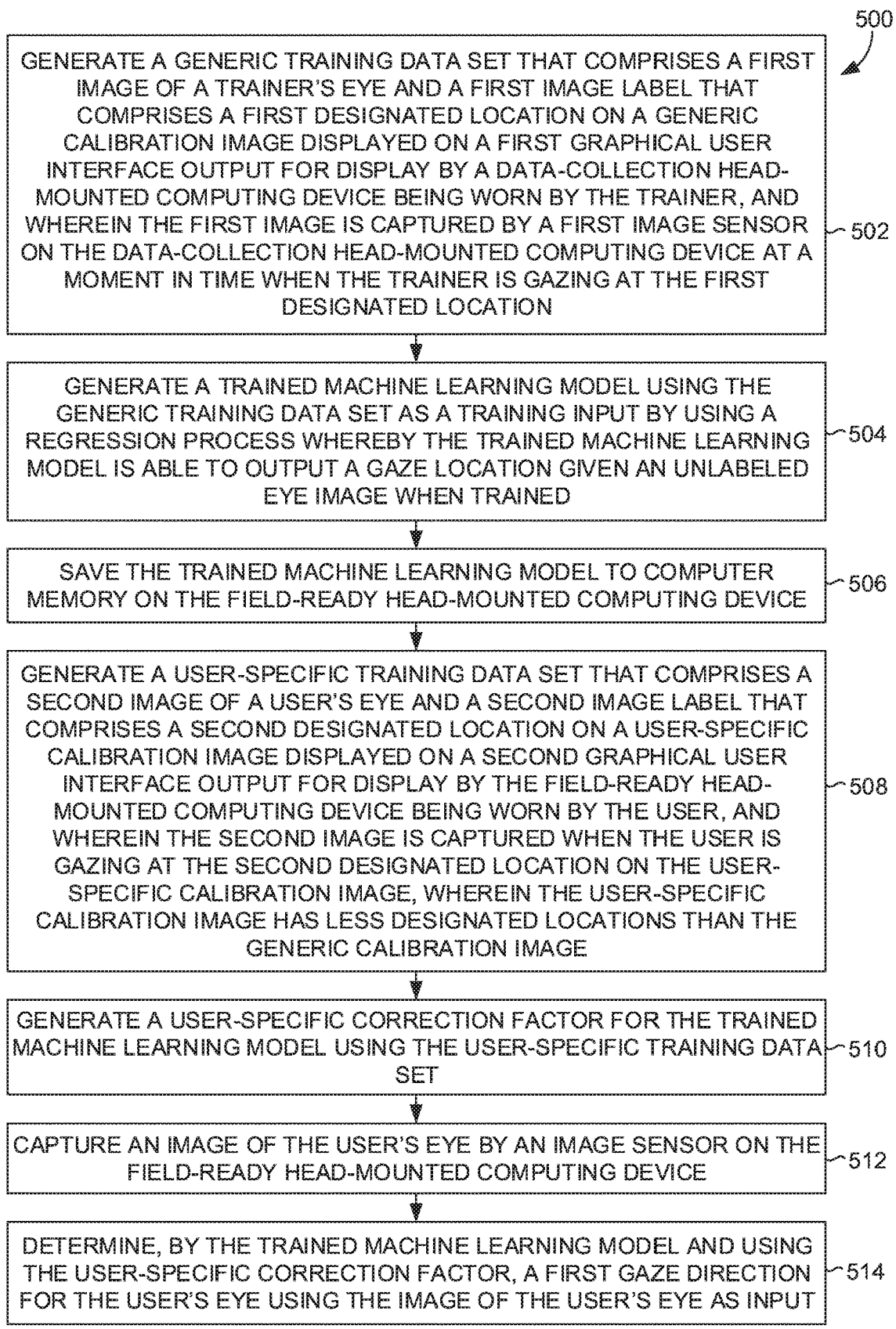

Turning now to FIG. 5, a flow chart showing a method 500 for pre-calibrating an eye tracking apparatus of a field-ready head-mounted computing device is provided.

At step 502, a generic training data set that comprises a first image of a trainer's eye and a first image label is generated. The first image label comprises a first designated location on a generic calibration image displayed on a first graphical user interface output for display by a data-collection head-mounted computing device being worn by the trainer. The first image is captured by a first image sensor on the data-collection head-mounted computing device at a moment in time when the trainer is gazing at the first designated location. The collection of training sets has been described previously with reference to FIG. 1.

At step 504, a trained machine learning model is generated using the generic training data set as a training input by using a regression process whereby the trained machine learning model is able to output a gaze location given an unlabeled eye image when trained. Training a machine learning model has been described previously with reference to FIG. 3.

At step 506, the trained machine learning model is saved on the field-ready head-mounted computing device.

At step 508, a user-specific training data set is generated that comprises a second image of a user's eye and a second image label. The second image label comprises a second designated location on a user-specific calibration image displayed on a second graphical user interface output for display by the field-ready head-mounted computing device being worn by the user. The second image is captured when the user is gazing at the second designated location on the user-specific calibration image. The user-specific calibration image has less designated locations than the generic calibration image. The collection of user-specific training data has been described previously with reference to FIG. 2.

At step 510, a user-specific correction factor is generated for the trained machine learning model using the user-specific training data set. The correction factor has been described previously with reference to FIG. 3.

At step 512, an image of the user's eye is captured by an image sensor on the field-ready head-mounted computing device.

At step 514, the trained machine learning model determines a first gaze direction for the user's eye using the image of the user's eye as input along with the user-specific correction factor.

Figure 6:
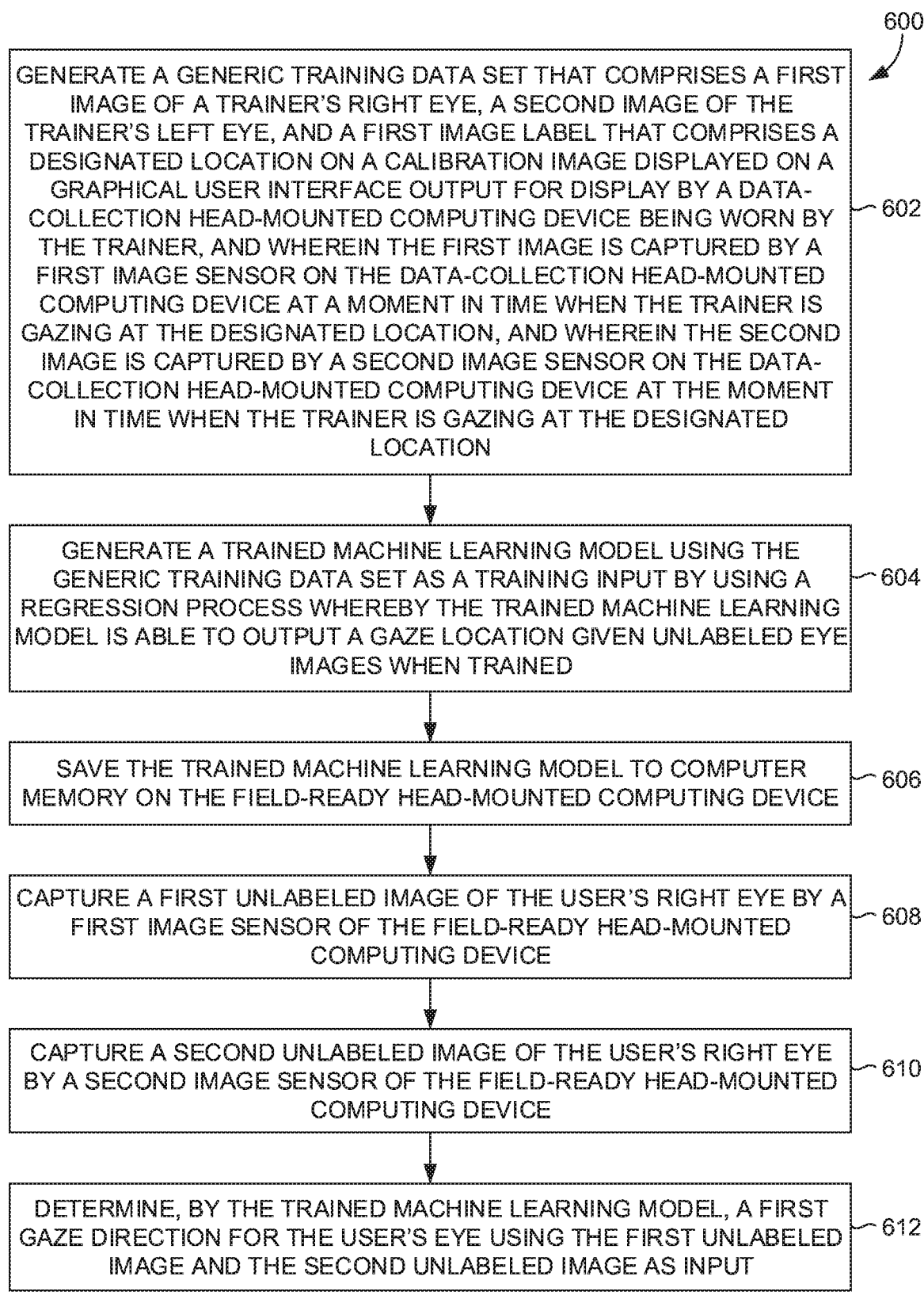

Turning now to FIG. 6, a flow chart showing a method 600 for pre-calibrating an eye tracking apparatus of a field-ready head-mounted computing device is provided.

At step 602, a generic training data set that comprises a first image of a trainer's right eye, a second image of the trainer's left eye, and a first image label is generated. The first image label may comprise a designated location on a calibration image displayed on a graphical user interface output for display by a data-collection head-mounted computing device being worn by the trainer. The first image is captured by a first image sensor on the data-collection head-mounted computing device at a moment in time when the trainer is gazing at the designated location. The second image is captured by a second image sensor on the data-collection head-mounted computing device at the moment in time when the trainer is gazing at the designated location. The collection of training sets has been described previously with reference to FIG. 1.

At step 604, a trained machine learning model is generated using the generic training data set as a training input by using a regression process whereby the trained machine learning model is able to output a gaze location given unlabeled eye images when trained. Training a machine learning model has been described previously with reference to FIG. 3.

At step 606, the trained machine learning model is saved on the field-ready head-mounted computing device.

At step 608, a first unlabeled image of the user's right eye is captured by a first image sensor of the field-ready head-mounted computing device;

At step 610, a second unlabeled image of the user's right eye is captured by a second image sensor of the field-ready head-mounted computing device; and At step 612, the trained machine learning model determines a first gaze direction for the user's eye using the first unlabeled image and the second unlabeled image as input.

Figure 7:
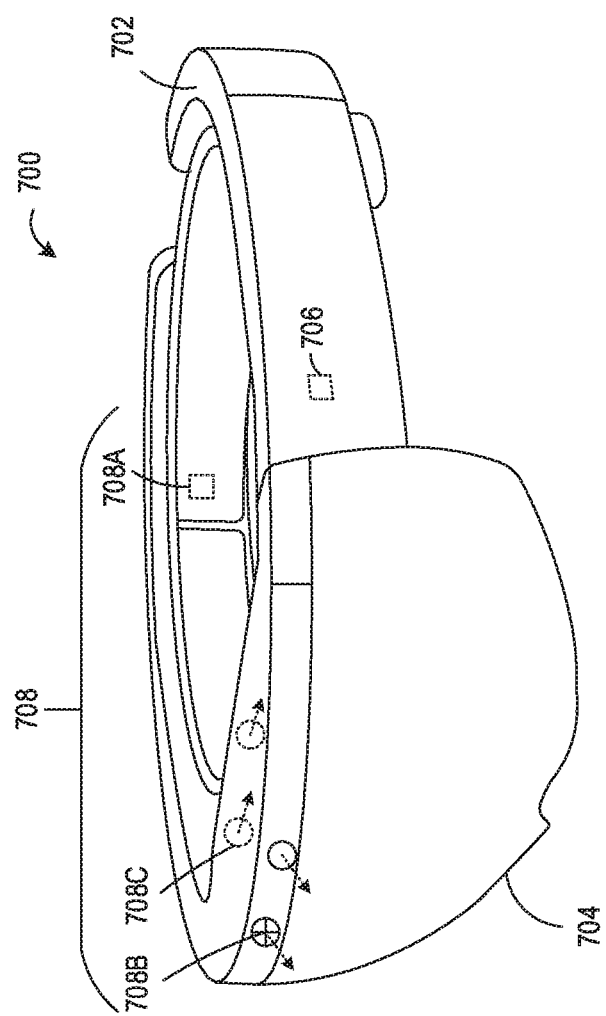
FIG. 7 is a diagram of an augmented reality headset, suitable for use in implementing an aspect of the technology.

FIG. 7 shows an example head mounted display (HMD) device 700 that may include the eye tracking technology described herein. The HMD device 700 may be worn by a user according to an example of the present disclosure. In other examples, an HMD device may take other suitable forms in which an at least partially see-through display is supported in front of a viewer's eye or eyes in an augmented reality HMD device configuration.

In the example of FIG. 7, the HMD device 700 includes a frame 702 that wraps around the head of the user to position a display device 704 close to the user's eyes. The display device 704, may, for example, be used in environment 100 illustrated in FIG. 1 and described above. The frame supports additional components of the HMD device 700, such as, for example, a processor 706 and input devices 708. The processor 706 includes logic and associated computer memory configured to provide image signals to the display device 704, to receive sensory signals from input devices 708, and to enact various control processes described herein, for example, in response to detecting a user's eye gaze.

The input devices 708 may include various sensors and related systems to provide information to the processor 706. Such sensors may include, but are not limited to, an inertial measurement unit (IMU) 708A, one or more outward facing image sensors 708B, and one or more inward facing image sensors 708C. The one or more inward facing image sensors 708C may be configured to acquire image data in the form of gaze tracking data from a wearer's eyes.

The one or more outward facing image sensors 708B may be configured to capture and/or measure physical environment attributes of the physical environment in which the HMD device 700 is located. In one example, outward facing image sensors 708B may include a visible-light camera configured to collect a visible-light image of a physical space. Further, the one or more outward facing image sensors 708B may include a depth camera configured to collect a depth image of a physical space. More particularly, in one example, the depth camera is an infrared time-of-flight depth camera. In another example, the depth camera is an infrared structured light depth camera.

Data from the outward facing image sensors 708B may be used by the processor 706 to generate and/or update a three-dimensional (3D) model of the physical space. Data from the outward facing image sensors 708B may be used by the processor 706 to identify surfaces of the physical space and/or measure one or more surface parameters of the physical space. The processor 706 may execute instructions to generate/update virtual scenes displayed on display device 704 and identify surfaces of the physical space in any suitable manner.

In augmented reality configurations of HMD device 700, the position and/or orientation of the HMD device 700 relative to the physical environment may be assessed so that augmented-reality images may be accurately displayed in desired real-world locations with desired orientations. As noted above, the processor 806 may execute instructions to generate a 3D model of the physical environment including surface reconstruction information that may be used to identify surfaces in the physical space. In both augmented reality and non-augmented reality configurations of HMD device 700, the IMU 708A of HMD device 700 may be configured to provide position and/or orientation data of the HMD device 700 to the processor 706.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
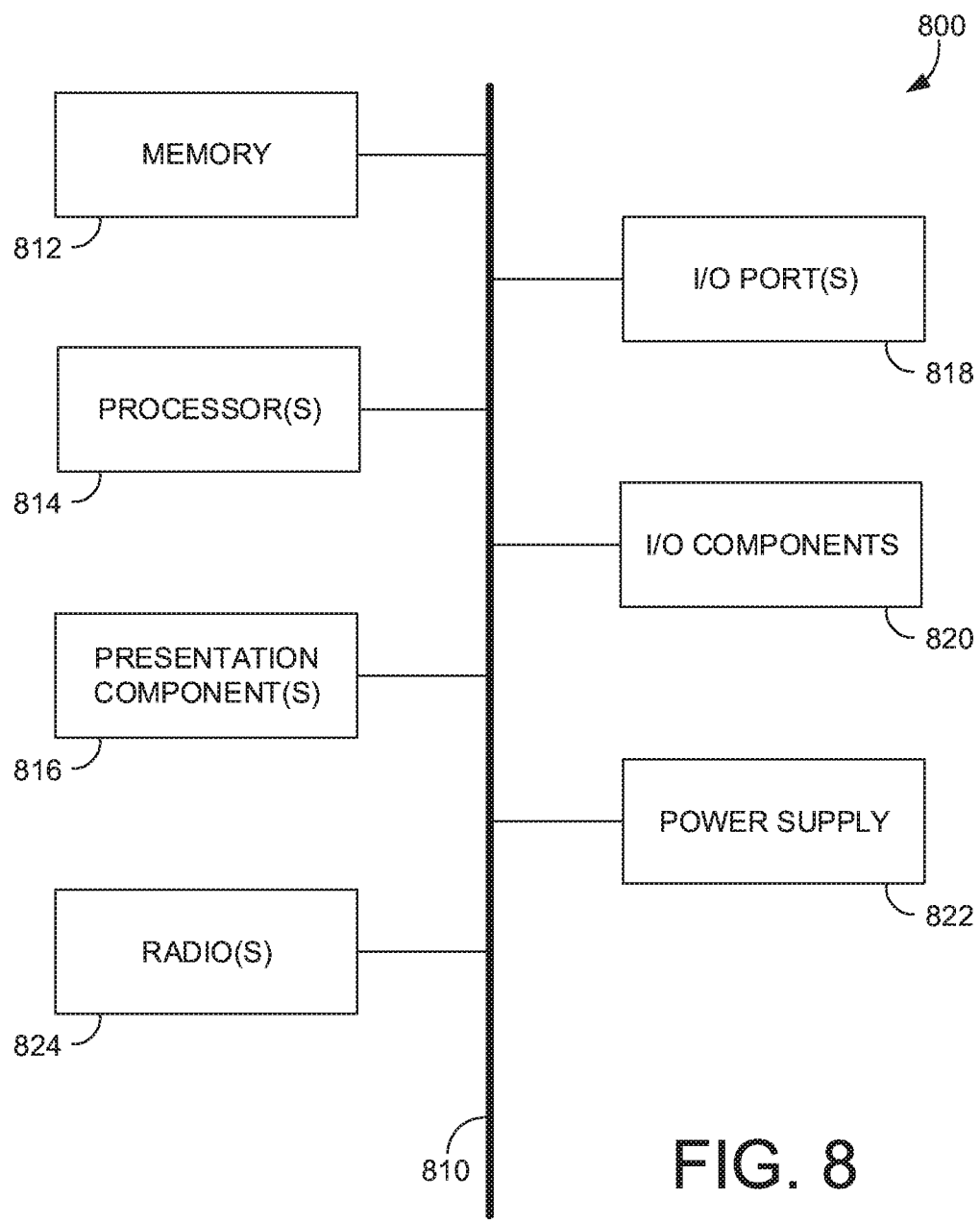
FIG. 8 is a block diagram of an exemplary computing environment suitable for use in implementing an aspect of the technology.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. Bus 810 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more aspects of the present technology. Distinction is not made between such categories as "workstation," "server," "laptop," "handheld device," etc., as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer-storage media and communication media.

Computer-storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors 814 that read data from various entities such as memory 812 or I/O components 820. Presentation component(s) 816 presents data indications to a user or other device. Exemplary presentation components include a display device, speaker, printing component, vibrating component, and the like.

The I/O ports 818 allow computing device 800 to be logically coupled to other devices, including I/O components 820, some of which may be built in. Illustrative components include a microphone, joystick, game pad, satellite dish, scanner, printer, wireless device, etc.

The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some aspects of computing device 800 may include one or more radio(s) 824 (or similar wireless communication components). The radio 824 transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method for pre-calibrating an eye tracking apparatus of a field-ready head-mounted computing device, the method comprising:
generating a training data set that comprises a first image of a trainer's eye and an image label that comprises a designated location on a generic calibration image displayed on a graphical user interface output for display by a data-collection head-mounted computing device being worn by the trainer, and wherein the first image is captured by a first image sensor on the data-collection head-mounted computing device at a moment in time when the trainer is gazing at the designated location, wherein the training data set comprises data instances generated by multiple trainers having a diversity of eye characteristics; generating a trained machine learning model using the training data set as a training input by using a regression process whereby the trained machine learning model is able to output a gaze location given an unlabeled eye image when trained; and saving the trained machine learning model to computer memory on the field-ready head-mounted computing device.

2. The method of claim 1, wherein the method further comprises:
capturing an image of a user's eye by an image sensor on the field-ready head-mounted computing device; and
determining, by the trained machine learning model, a first gaze direction for the user's eye using the image of the user's eye as input.

3. The method of claim 2, wherein the graphical user interface is generated by an augmented reality headset.

4. The method of claim 2, wherein the first gaze direction is determined without explicitly isolating features of the user's eye from the image of the user's eye.

5. The method of claim 1, wherein the generic calibration image comprises at least twenty designated locations.

6. The method of claim 1, wherein the first image is of the trainer's right eye, and wherein the training data set also comprises a third image of the trainer's left eye captured by a second image sensor on the data-collection head-mounted computing device while the trainer is gazing at the designated location.

7. A method for pre-calibrating an eye tracking apparatus of a field-ready head-mounted computing device, the method comprising:
generating a generic training data set that comprises a first image of a trainer's eye and a first image label that comprises a first designated location on a generic calibration image displayed on a first graphical user interface output for display by a data-collection head-mounted computing device being worn by the trainer, and wherein the first image is captured by a first image sensor on the data-collection head-mounted computing device at a moment in time when the trainer is gazing at the first designated location, wherein the generic training data set comprises data instances generated by multiple trainers having a diversity of eye characteristics; generating a trained machine learning model using the generic training data set as a training input by using a regression process whereby the trained machine learning model is able to output a gaze location given an unlabeled eye image when trained; saving the trained machine learning model on the field-ready head-mounted computing device; generating a user-specific training data set that comprises a second image of a user's eye and a second image label that comprises a second designated location on a user-specific calibration image displayed on a second graphical user interface output for display by the field-ready head-mounted computing device being worn by the user, and wherein the second image is captured when the user is gazing at the second designated location on the user-specific calibration image, wherein the user-specific calibration image has less designated locations than the generic calibration image; generating a user-specific correction factor for the trained machine learning model using the user-specific training data set; capturing an image of the user's eye by an image sensor on the field-ready head-mounted computing device; and determining, by the trained machine learning model and using the user-specific correction factor, a first gaze direction for the user's eye using the image of the user's eye as input.

8. The method of claim 7, wherein the first gaze direction is determined without explicitly isolating features of the user's eye from the image of the user's eye.

9. The method of claim 7, wherein the method further comprises determining a second gaze direction for the user's eyes using an eye-feature-based method that also uses the image of the user's eye as input; determining that the first gaze direction and the second gaze direction are within a threshold tolerance; and using the first gaze direction to control a feature of the field-ready head-mounted computing device.

10. The method of claim 7, wherein the method further comprises determining a second gaze direction for the user's eyes using an eye-feature-based method that also uses the image of the user's eye as input; determining that the first gaze direction and the second gaze direction are not within a threshold tolerance; and discarding the first gaze direction without use by the field-ready head-mounted computing device.

11. The method of claim 7, wherein the user-specific calibration image has five or less designated locations and the generic calibration image has at least twenty designated locations.

12. The method of claim 7, wherein the user-specific training data set comprises five or less images.

13. The method of claim 7, wherein the generic training data set comprises a plurality of labeled images derived from a plurality of trainers having a diversity of eye characteristics.

14. The method of claim 7, wherein the field-ready head-mounted computing device is an augmented reality display.

15. One or more computer storage media that, when executed by a computing device, causes the computing device to perform a method for pre-calibrating an eye tracking apparatus of a field-ready head-mounted computing device, the method comprising:

generating a generic training data set that comprises a first image of a trainer's right eye, a second image of the trainer's left eye, and a first image label that comprises a designated location on a calibration image displayed on a graphical user interface output for display by a data-collection head-mounted computing device being worn by the trainer, and wherein the first image is captured by a first image sensor on the data-collection head-mounted computing device at a moment in time when the trainer is gazing at the designated location, and wherein the second image is captured by a second image sensor on the data-collection head-mounted computing device at the moment in time when the trainer is gazing at the designated location, wherein the generic training data set comprises data instances generated by multiple trainers having a diversity of eye characteristics; generating a trained machine learning model using the generic training data set as a training input by using a regression process whereby the trained machine learning model is able to output a gaze location given unlabeled eye images when trained; saving the trained machine learning model on the field-ready head-mounted computing device; capturing a first unlabeled image of the user's right eye by a first image sensor of the field-ready head-mounted computing device; capturing a second unlabeled image of the user's right eye by a second image sensor of the field-ready head-mounted computing device; and determining, by the trained machine learning model, a first gaze direction for the user's eye using the first unlabeled image and the second unlabeled image as input.

16. The media of claim 15, wherein the first gaze direction is determined without explicitly isolating features of the user's eye from the first unlabeled image or the second unlabeled image.

17. The media of claim 15, wherein the method further comprises determining a second gaze direction for the user's eyes using an eye-feature-based method that also uses the first unlabeled image and the second unlabeled image as input; determining that the first gaze direction and the second gaze direction are not within a threshold tolerance; and discarding the first gaze direction without use by the field-ready head-mounted computing device.

18. The media of claim 15, wherein the trained machine learning model is a convolutional neural network.

19. The media of claim 15, wherein the first image of a trainer's right eye has a size that captures all of the trainer's right eye, right eye lashes, and right eyebrow.

* * * * *